INVENTOR.
EVERETT S. MINARD

Jan. 19, 1954 E. S. MINARD 2,666,564
FILLING MACHINE
Filed March 2, 1950 6 Sheets-Sheet 2
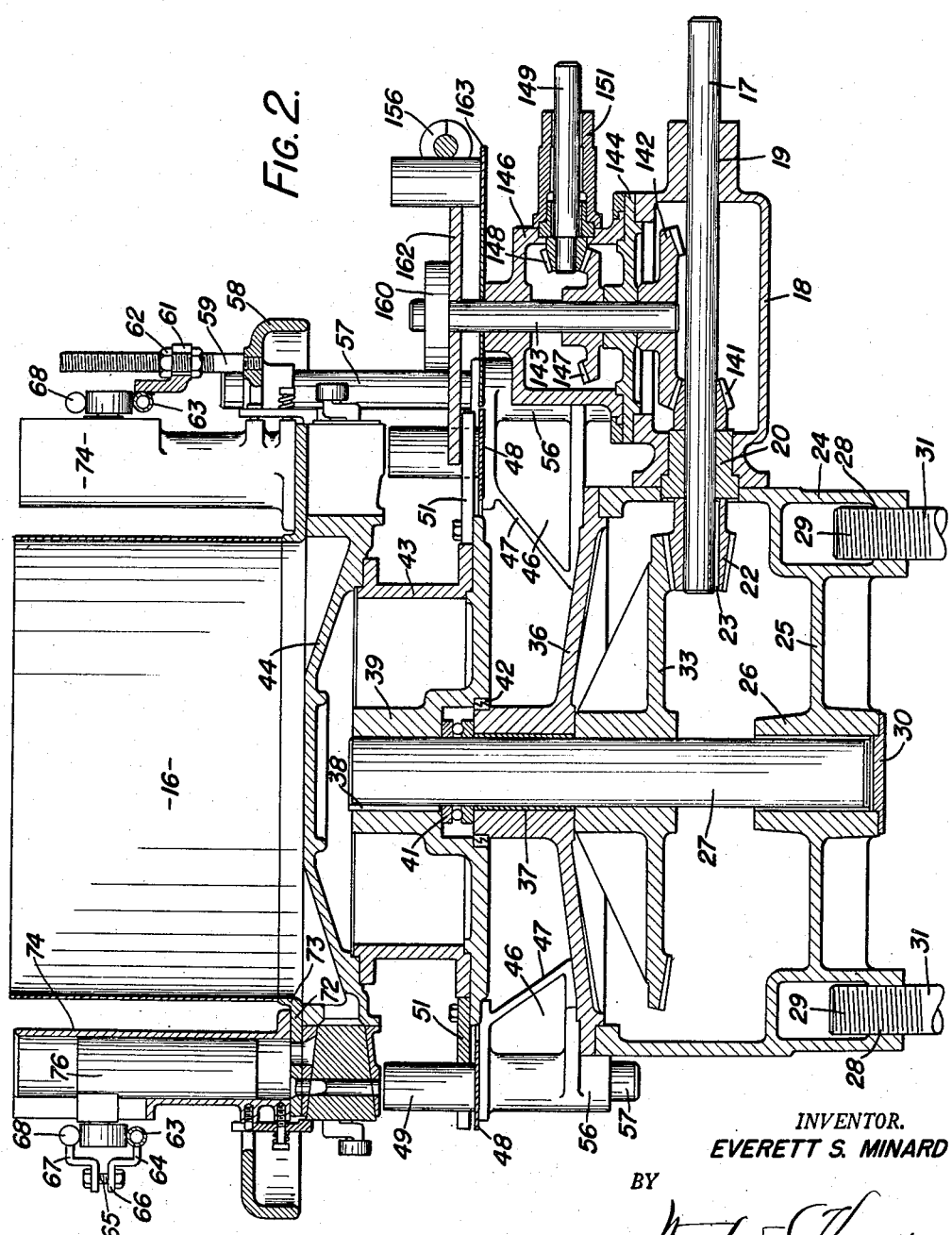
INVENTOR.
EVERETT S. MINARD
BY
ATTORNEY Jan. 19, 1954
E. S. MINARD
2,666,564
FILING MACHINE
Filed March 2, 1950
6 Sheets-Sheet 3
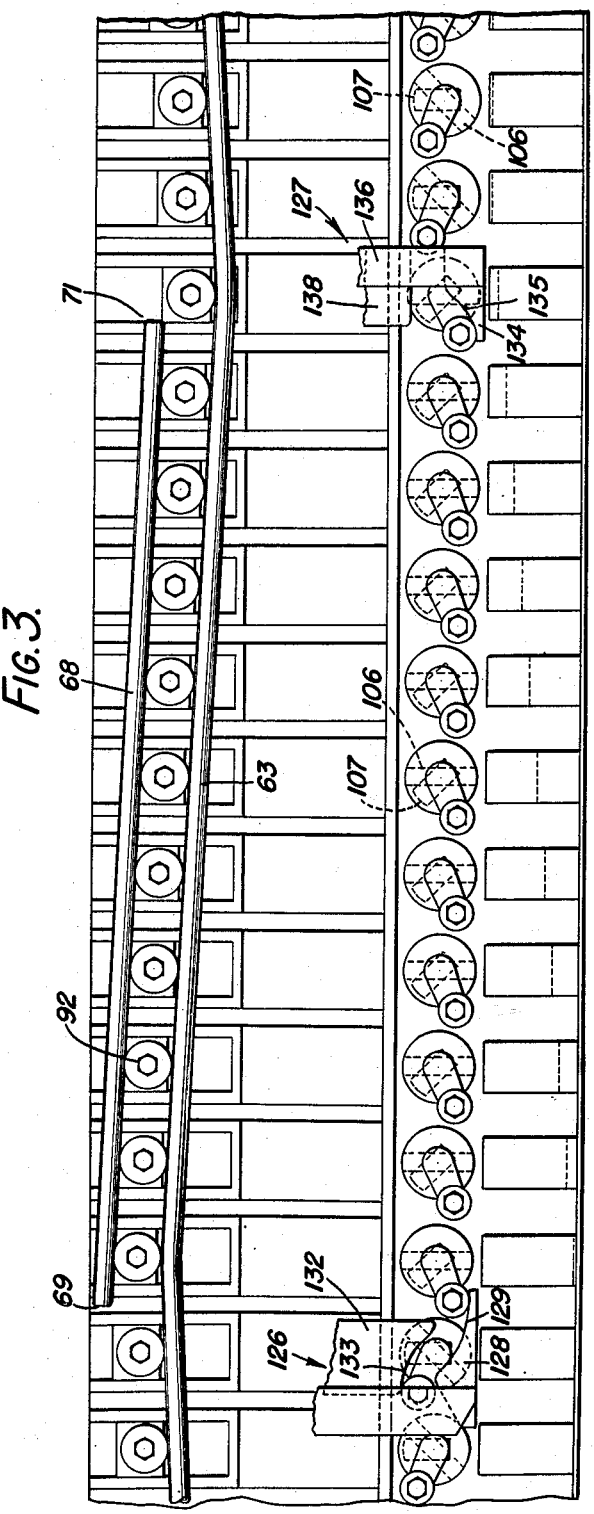
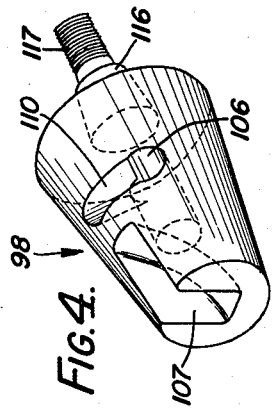
INVENTOR.
EVERETT S. MINARD
BY
ATTORNEY Jan. 19, 1954   E. S. MINARD   2,666,564
FILLING MACHINE Filed March 2, 1950   6 Sheets-Sheet 4

INVENTOR.
EVERETT S. MINARD
BY
ATTORNEY

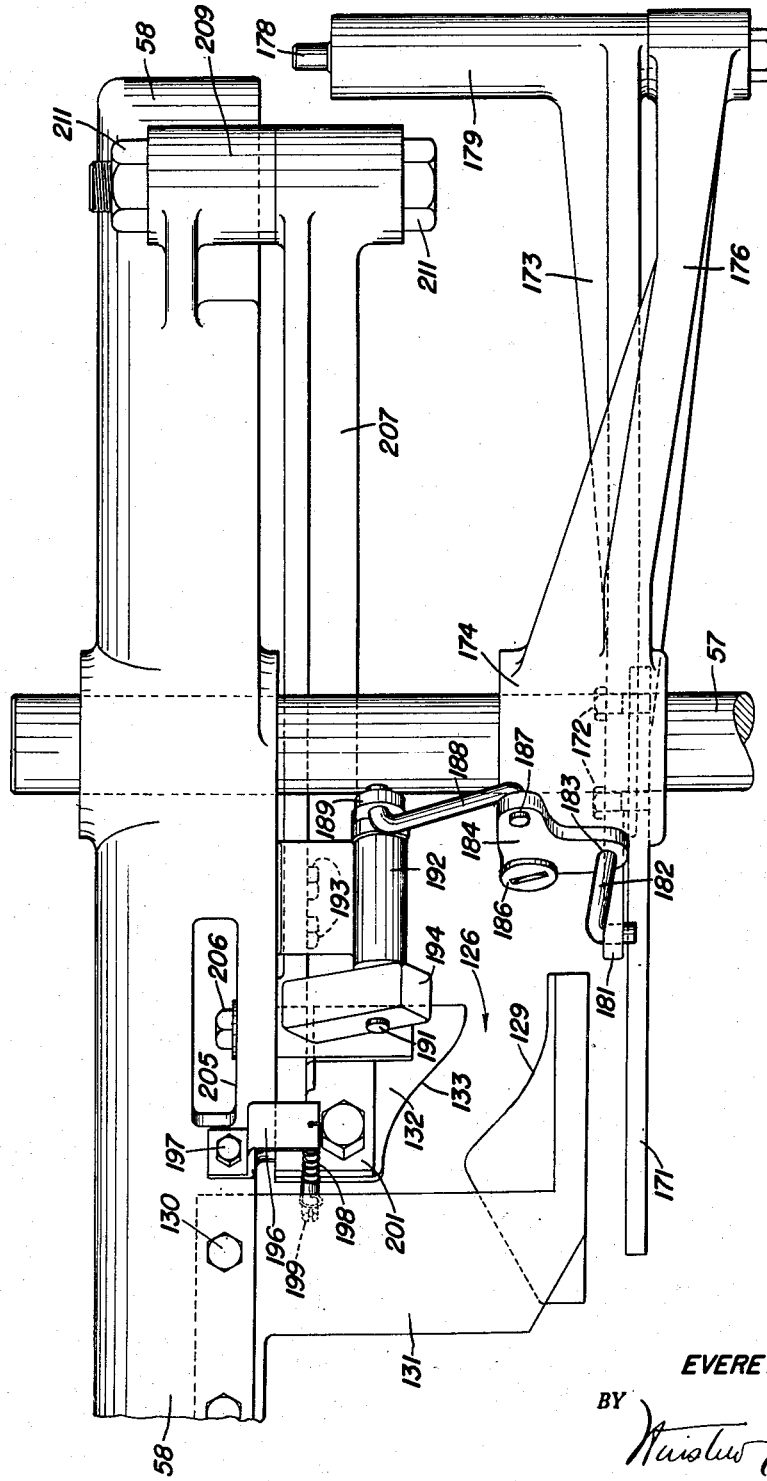

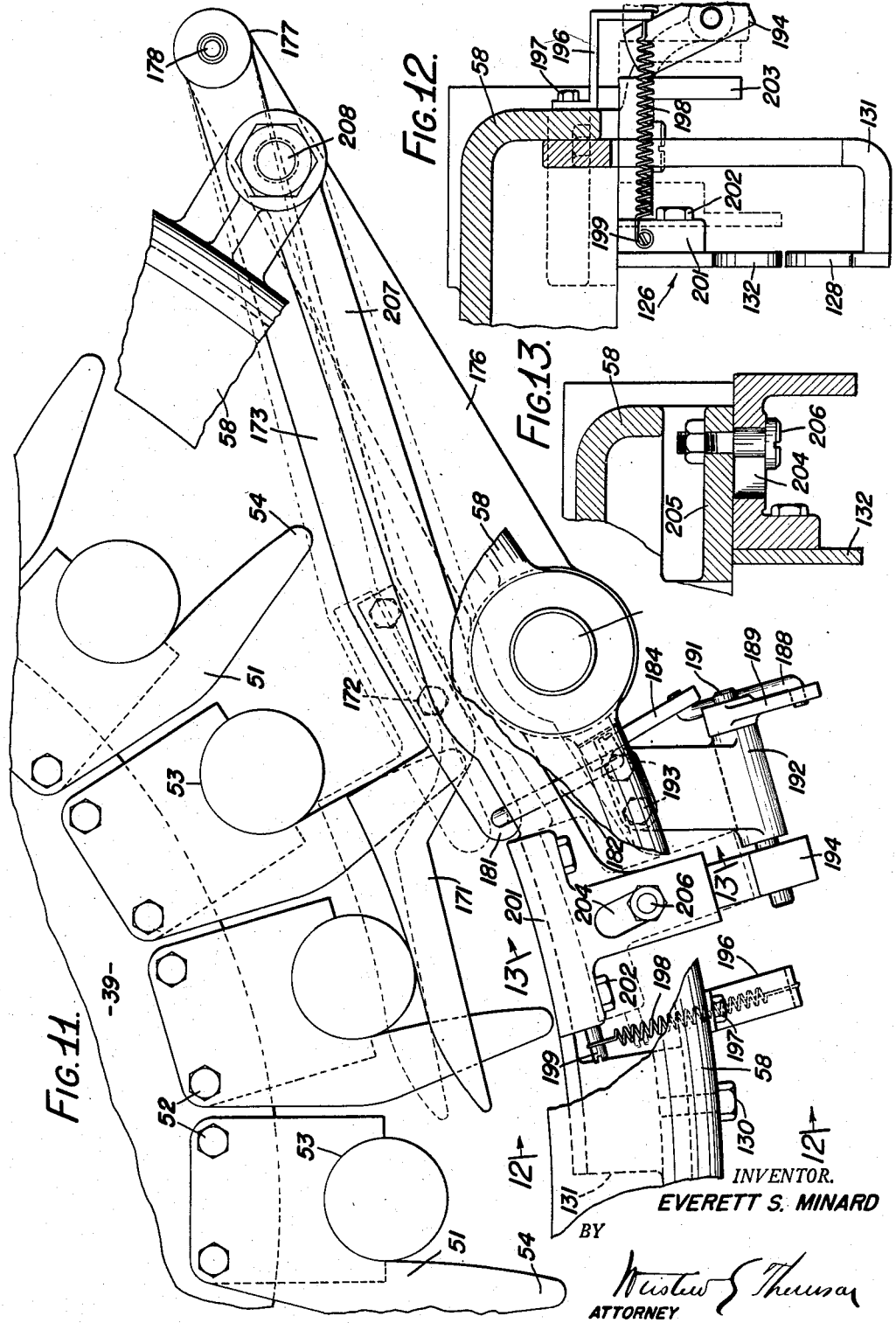

Patented Jan. 19, 1954

2,666,564

UNITED STATES PATENT OFFICE 2,666,564

FILLING MACHINE

Everett S. Minard, Fairport, N. Y., assignor to The Pfaudler Company, Rochester, N. Y., a corporation of New York Application March 2, 1950, Serial No. 147,218

11 Claims. (Cl. 226—97)

My invention relates to a machine for filling cans, glass jars or other containers with various products. The machine of my invention is suitable for filling containers with free flowing liquids such as tomato juice, brine, wines, soups, fruit juices, oil and the like or semi-flowable materials such as applesauce, thick soups and baby foods which are usually finely divided or pulpous vegetable products with just sufficient liquid to render them sluggishly flowable.

An object of my invention is to provide a machine for filling containers with an accurate measured volume and hence weight of flowable or semi-flowable materials.

Another object of my invention is to provide means in a container filling machine for varying the amount of fill in accordance with the volume or weight of material to be placed in the container.

Another object of my invention is to provide a machine the essential parts of which are quickly and conveniently available for repair, adjustment or replacement.

Still another object of my invention is to provide improved means for insuring that when a container is not present in the machine in a position to be filled, the filling operation is not initiated so that the product is not wasted, or in other words, an improved no-can, no-fill mechanism.

Another object of my invention is to provide a filling machine which can be readily converted to fill containers varying widely in capacity.

A further object of my invention is to provide a tapered plug valve which is self-adjusting; automatically compensates for wear; is easily removed from cleaning and repair; and maintains accurate measuring control of the product.

My invention further contemplates the provision of a container filling machine for flowable or semi-flowable materials of the piston type in which the pistons and cylinders rotate together with the containers to be filled and the throw of the pistons may be accurately controlled to regulate the volume of fill and wherein simplified no-can, no-fill mechanism is provided and in which a special, frusto-conical, two-way non-dripping valve is provided for controlling the flow of material from the cylinders into the containers.

Other objects and advantages of my invention will be set forth in the claims and will appear from the following description, when taken in connection with the accompanying drawings, in which:

Fig. 2 is a vertical sectional view of the machine of my invention;

Fig. 3 is a diagrammatic view showing the machine unrolled to illustrate particularly the operation of the piston actuating cams and the cams for opening and closing the two-way valve;

Fig. 4 is a perspective view of the valve;

Fig. 10 is an enlarged elevation of the no-can, no-fill mechanism;

Fig. 11 is a top plan view thereof with parts broken away, better to illustrate the invention;

Fig. 12 is a sectional view taken substantially on the line 12—12 of Fig. 11 in the direction indicated by the arrows; and Fig. 13 is a sectional view taken substantially on the line 13—13 of Fig. 11 in the direction indicated by the arrows.

Figure 1:
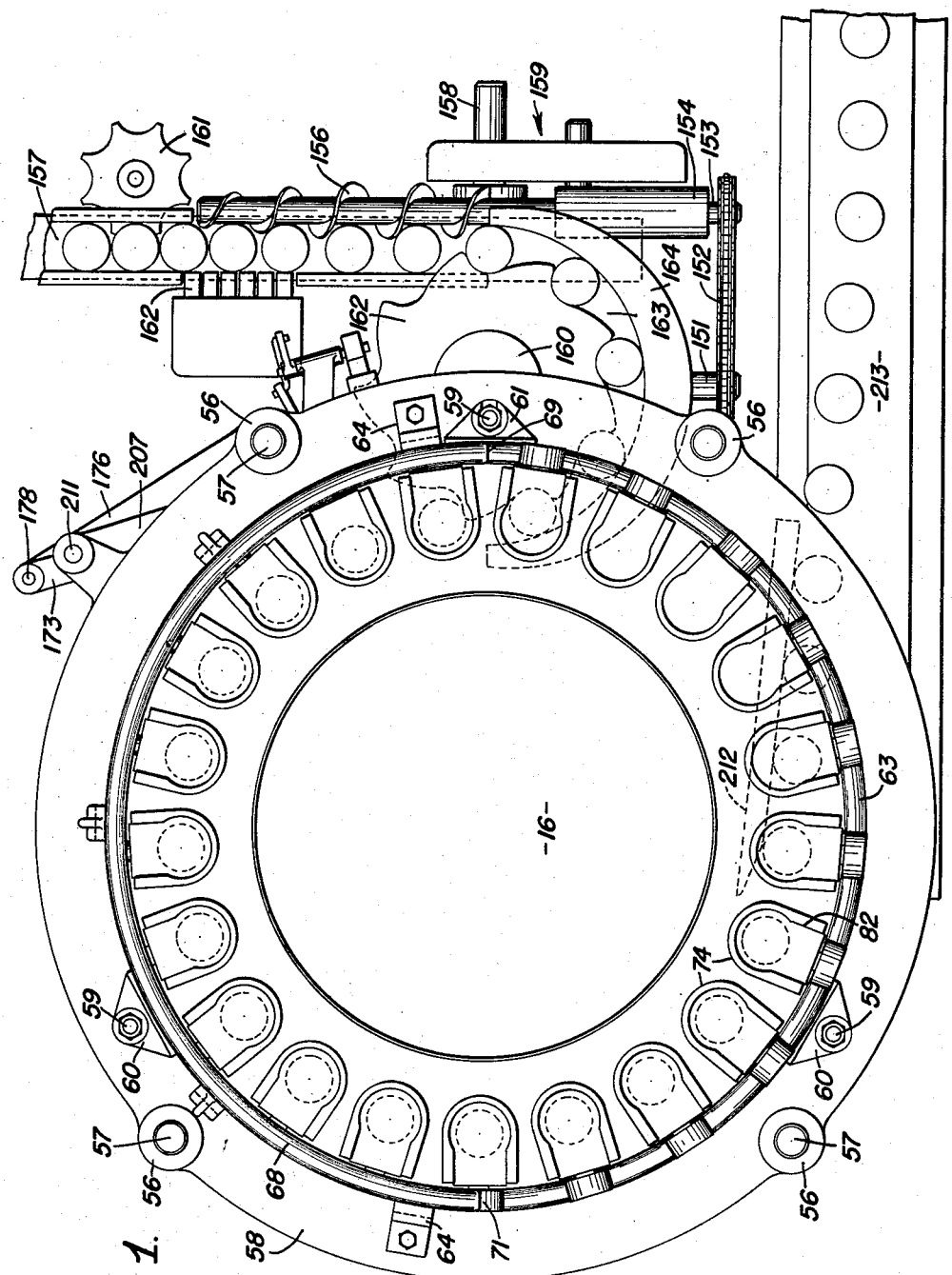
Fig. 1 is a top plan view of the machine of my invention, together with the means for feeding the cans, glass jars or other containers into the machine and the means for discharging the filled containers from the machine.

Referring to Fig. 1, the machine of my invention is circular in plan with the product being conveyed in any suitable preferably continuous manner (not shown) to a tank 16 which constitutes the reservoir from which the product is withdrawn for discharge into the cans, glass jars or other containers to be filled.

Referring now to Fig. 2, a main shaft 17 may be directly connected to a suitable driving motor or may be driven from any other suitable source of power (not shown). The main shaft 17 enters a suitable feed casing 18 in which the shaft is suitably journaled as indicated at 19 and 20. The main shaft 17 projects through the feed casing 18 and has a bevel pinion 22 keyed to the end thereof as indicated at 23.

The casing 24 constitutes the main frame of the machine and includes a plate 25 which has a boss formed therein as indicated at 26. The boss is bored for the reception of a center shaft 27 and the lower end of the bore may be provided with a cap 30. The frame 24 is also provided with threaded openings 28 into which the threaded ends 29 of legs 31 are adapted to be fitted. It will be apparent that the legs may be individually adjusted for the purpose of leveling the machine or adjusting its height. The feed casing 18 may be carried by the main frame 24 being secured thereto by suitable bolts (not shown).

The beveled main pinion 22 drives a beveled main gear 33 which is fixed to the shaft 27 as by a set screw or by keying (not shown). The center shaft extends upward and passes through a bore formed in a top bearing plate 36, the shaft rotating in a bearing sleeve 37 carried by the stationary bearing plate 36.

Mounted on the top of the center shaft 27 and keyed thereto, as indicated at 38, is a top mounting plate 39 which rotates with the shaft. A suitable bearing 41 is provided between the top bearing plate 36 and the rotatable top mounting plate 39 and a suitable seal 42 is provided between the rotating and stationary parts.

Carried by and rigid with the top mounting plate 39 is a cylindrical member 43 to which a cylinder or tank base 44 is rigidly secured. The cylinder base is substantially frusto-conical in shape and constitutes the lower wall of the tank or reservoir 16. The interior of the tank 16 and the frusto-conical shape of the base thereof enables the material being packed to flow downward along the inclined walls of the base 44, this action being aided by centrifugal force as the tank rotates. Thus, the material being packed is constantly urged towards the discharge outlets therefrom as will be presently described. It will now be appreciated that the tank or reservoir 16 together with its base 44 and all other of the parts mounted on the center shaft 27 are rotated from the main shaft 17 with the exception of the top bearing plate 36.

Carried by the top bearing plate 36 are supports 46 which include suitable strengthening ribs 47. The supports 46 carry an annular can table 48 upon which the cans, glass jars or other containers slide during the operation of the machine. The containers 49 are pushed or slid around upon the can table 48 by means of feed chucks 51. As shown most clearly in Fig. 11, the feed chucks are bolted to the top mounting plate 39, as indicated at 52, and are each provided with a semi-circular pocket 53 for the reception of a container. The feed chucks each includes a guide finger 54 by which the containers are guided into the semicircular pockets 53 in a manner which will presently appear. It will be appreciated that the pocket is made for one definite diameter of container but that upon removal of the bolts 52, other feed chucks may be substituted for those shown to accommodate containers of different diameters.

Carried in suitably bored bosses formed in the supports 46, as indicated at 56, are a plurality of posts 57 (see also Fig. 1). The supports carry a cam support ring 58. The cam support ring 58 extends completely around the machine and is adapted to receive suitable support posts 59 shown in Fig. 2 (see also Fig. 1). Three support posts 59 are shown so as to provide three point support for the cam parts presently described. Brackets 60 are substantially rigidly connected to their support posts 59. One of the support posts 59 is threaded into the cam support ring 58 and the upwardly extended end is threaded to receive a cam adjusting bracket 61 which loosely fits over the post 59 as shown in the drawings. A pair of nuts 62 enable the cam adjusting bracket to be moved upward and downward along the post and locked in position by the nuts to hold the cam adjusting bracket in any desired position of adjustment.

The cam adjusting bracket 59 and the fixed bracket 60 have welded thereto a circular cam element or track 63 which extends completely around the machine as shown in Fig. 1. The cam track 63 is preferably in the form of a tubular member which encircles the tank 16 in spaced relation thereto. Welded to the cam element 63 at suitable intervals are clamp elements 64 which have bolt receiving parts 66. A clamp element 67 having a bolt receiving opening is secured to the clamp element 64 by a bolt 65 and is welded, as indicated in Fig. 2, to an upper cam element 68 which overlies the lower cam element 63 but extends only through approximately 180 degrees as indicated at 69 and 71 (Fig. 1). Shims may be provided around the bolts 65 to permit removal of a shim or shims for the purpose of adjusting the distance between the cams 63 and 68 to allow for wear of the cams or rollers.

Carried by the cylinder base 44 (Fig. 2) is an annular ring or platform 72 which is flanged as indicated at 73 to receive the tank 16, the tank 16 being secured thereto as by welding or in any other suitable manner. The platform 72 is adapted to have mounted thereon a plurality of cylinders 74, the details of which and associated parts are shown most clearly in Figs. 5 to 9 inclusive. Any desired number of cylinders may be employed. In the particular illustration shown, 21 cylinders are shown but it is obvious that this number may be varied in accordance with the capacity and speed of the machine and to some extent in accordance with the character of the material to be filled into the containers. It will be appreciated that the annular platform 72 rotates with the cylinder base 44 and that the cylinders 74 are rigidly secured to the annular platform 72 so as to rotate therewith.

Figures 5, 6:
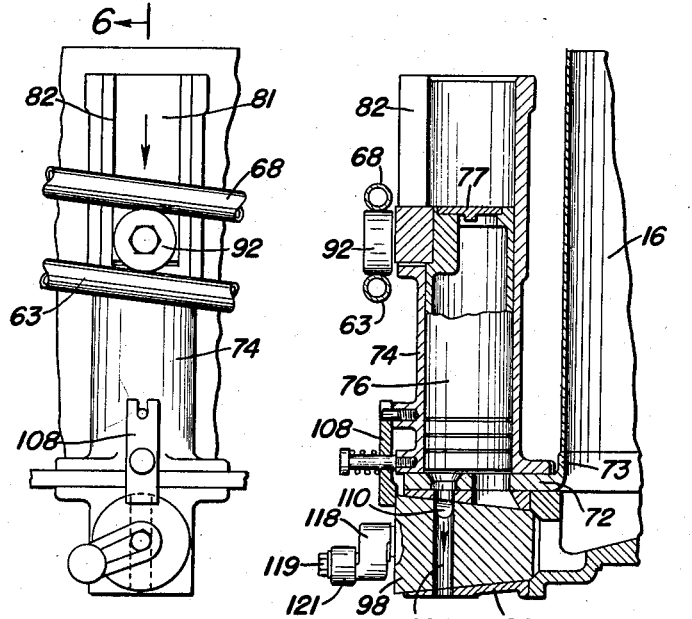
Fig. 5 is an enlarged face view of the plug type two-way valve and the locking means therefor with the piston moving downward in the cylinder and the valve open to discharge material into a container.
Fig. 6 is a sectional view taken substantially on the line 6—6 of Fig. 5 in the direction indicated by the arrows.
Figure 7:
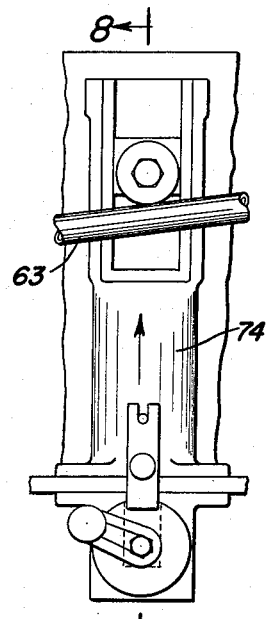
Fig. 7 is a view similar to Fig. 5 except showing the plug valve in its closed position and the piston moving upward in its cylinder so as to withdraw material from the tank or reservoir.
Figure 9:
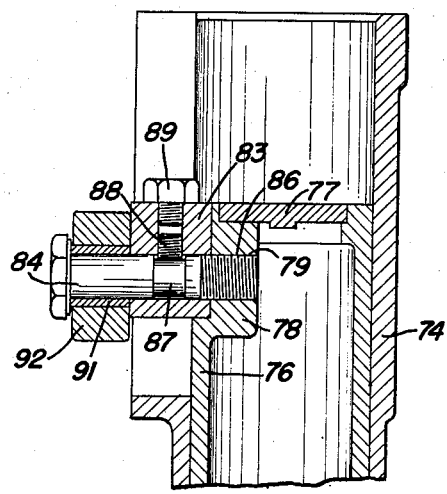
Fig. 9 is an enlarged sectional view of a portion of Fig. 8.

Operable in each of the cylinders 74 is a piston 76 which has a hollow interior for the purpose of decreasing weight and has an upper opening which is closed by a cap 77. The upper ends of the pistons 76 have enlarged bosses 78 provided with threaded bores 79. The outer wall of each of the cylinders 74 as shown most clearly in Fig. 5 is provided with a rectangular slot 81, the side edges 82 of which provide guides or ways for a piston guide block 83 (Fig. 9).

A roller stud 84 has a threaded end 86 for reception in the threads 79 of the piston and a portion 87 of reduced diameter for the reception of a set screw 88. The guide block 83 is bored and threaded for the reception of the set screw and the reception of a cap screw 89 which closes the bore opening in the guide block 83. The roller stud is adapted to receive a sleeve 91 upon which a roller 92 freely rotates.

The rollers 92 ride on the lower cam element 63 during their entire path of rotation around the tank 16 and during approximately 180 degrees of such rotation, they ride between the lower cam 63 and the upper cam 68 for a purpose which will later appear. The cams are shaped so that the rollers move upward and downward in response to the shaping of the cams 63 and 68. By reason of the upward and downward movement of the rollers 92 and the threading of the roller studs 84 into the piston walls, the pistons are moved upward and downward in accordance with the shaping of the cams. During their reciprocating movement, the pistons are held rigid in the cylinders so that they cannot rotate with respect to the cylinders by the guide blocks 83 and the guides 82 formed in the walls of the cylinders.

As shown most clearly in Figs. 6 and 8, below each of the cylinders 74 a valve body 96 is mounted. The valve bodies 96 may be secured to the adjacent parts in any suitable manner (not shown) as by bolts so that the valve bodies may be readily removed for repair or replacement. Each of the valve bodies 96 has a frusto-conical seat 97 adapted to receive a frusto-conical valve 98. The lower end of each of the cylinders is open and communicates with a pair of openings 99 and 101 formed in the annular platform 72. The openings or ports 99 and 101 in turn communicate with registering openings or ports in the valve body 96. The valve body 96 has a bore or port 102 which is in alinement with the port 99 and an opening 103 in its rear wall. Each of the rear wall openings 103 in the valve bodies 96 communicates with a passage or port 104 formed in the cylinder base 44 so that the product in the tank 16 may have access to the cylinders 74 when the pistons are moved upward, as indicated in Fig. 8.

The valve 98, shown most clearly in Fig. 4, is frusto-conical in shape and is provided with a bore or through discharge opening 106 which extends through the valve and intersects the longitudinal axis thereof at right angles thereto. When properly positioned for discharge of the material being packed from the cylinders to the containers, the valve is rotated so that the through opening 106 in the valve is in registry with the openings or ports 99 and 102. The valve is further provided with a pie shaped cut-out 107 which, when the valve is properly positioned, provides communication through ports 101 and passage 104 between the tank 16 and the cylinders 74. The valve is further provided with a port 110 which extends across the outer face of the valve and connects with the port 106.

Figure 8:
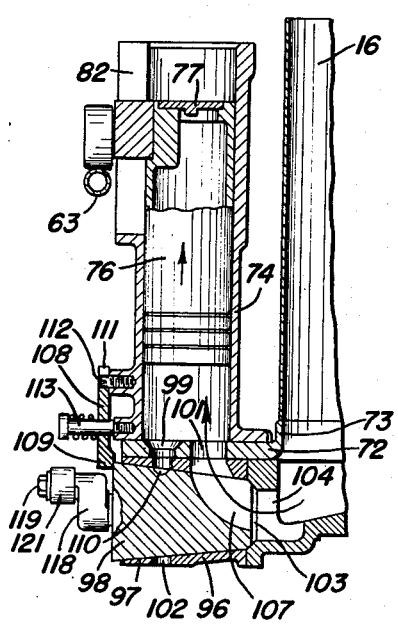
Fig. 8 is a view similar to Fig. 6 showing the piston on its upward, intake stroke and the valve in a position such as to enable withdrawal of the product from the tank or reservoir.

The purpose of the port 110 is to maintain communication between the cylinder and the port 106 when the parts are in the position shown in Fig. 8. This communication maintains the port 106 filled with material at all times when the valve is in the closed position of Fig. 8. In such case leakage of material from the port 106 is blocked by the lower portion of the inner wall of the valve body. The purpose of this arrangement, among other things, is to avoid the results of emptying the port 106 when the machine is stopped for any reason. Without the port 110, if the machine is stopped the cylinders and the ports 106 which are in the discharge position will empty themselves particularly in the case of free flowing liquids. The containers in the course of being filled will be overfilled but more serious is the fact that the next succeeding containers will be underfilled by the volume of the port 106. This makes it necessary for the operator to withdraw from the line six or eight underfilled containers when the machine is started up again, a difficult operation because of the high speed of the machine. This same withdrawal of underfilled containers is necessary each morning when the machine is started up. With the port 110, the port 106 fills up with material should it empty as soon as the valve is moved to the closed non-discharge position and the underfilled condition of containers, above described, is avoided.

It will be appreciated by a comparison of Figs. 6 and 8 that when communication is afforded between the cylinders and the through opening 106 in the valve for the purpose of discharging the product from the cylinders that the cutout 107 in the valve is out of registry with the ports 101 and 104. Moreover, as shown in Fig. 8, when the through opening 106 is out of communication with the openings or ports 99 and 102 except through port 110, the cutout 107 in the valve is in communication with the ports 101 and 104 for the purpose of allowing the material being packed to flow from the tank 16 into the cylinder 74 upon upward movement of the piston. Thus, the through opening 106 is angularly spaced around the valve from the opening 107, this spacing as indicated in Fig. 3 being approximately 45 degrees which is sufficient to insure that when one opening is in operative position the other is out of operative position and blocked off by the inner side walls of the valve body.

For the purpose of retaining the valves 98 in their seats in the valve bodies 96, each of the valves is provided with a valve lock 108 (Fig. 8), the lower end of which as indicated at 109 engages the exterior of the valve. The upper end of the valve lock is forked as indicated at 111 to straddle a bolt or dowel pin 112 carried in a bored boss integral with the cylinder side wall. The valve lock 108 has a bore for the reception of a valve lock screw 113 threaded into a boss formed on the exterior of the cylinder wall. Between the head of the bolt 113 and the face of the valve lock 108, a spring is provided which encircles the bolt and normally serves to apply pressure on the valve lock 108 to hold and lock the valve in position in its seat in the valve body.

It will be appreciated from the foregoing that the valve is resiliently pressed in engagement with its seat in the valve body 96 which provides an automatic take up for wear. Moreover, the fact that the valve is not rigidly held on its seat allows the valve to yield outward, to the left as viewed in Fig. 8, if the valve should tend to stick or freeze. This yielding action allows the valve to free itself of material which may tend to adhere to the contacting surfaces of the valve and seat. This action is aided by the taper of the valve and seat which may be described as a non-freezing angle of 12 degrees or more. This taper angle causes sufficient outward force on the valve to free the valve should it tend to stick or freeze. It will further be noted that the valve may be removed from its seat without the use of wrenches by merely lifting the valve lock 108 against the action of the spring and pulling out the valve.

Rigidly secured in the valve is an element 116, the element 116 being secured in a bore in the valve in any suitable manner along the axis thereof. The outer end of the element 116 is threaded as indicated at 117 (Fig. 4) to receive a valve arm or crank 118. The other end of the valve arm 118 has a threaded bore for the reception of a screw 119 which holds a roller 121 in position (Fig. 8).

Suitable means, as will be presently described, are provided to rotate the valve arm and thereby rotate the valve 98 so as to move the valve to the two above described positions in timed relation with the reciprocations of the pistons. In Fig. 6 the piston has been shown in its downward position upon the completion of a discharge of the material to be packed into the cans or other containers. Upon completion of the filling operation, the valve, through actuation of the valve arm 118 as will presently be described, is rotated through approximately 45 degrees to shift the valve 98 from the position shown in Fig. 6 to that shown in Fig. 8.

As indicated by the arrow in Fig. 8, the piston is in the course of an upward movement. During its upward movement the piston creates a subatmospheric pressure in the passages 101 and 104 which draws the material from the tank through the through passage therefrom into the cylinder. It will be appreciated that by reason of the relatively low pressure below atmosphere produced in the cylinder, semi-flowable materials many be withdrawn from the tank and discharged on the downward stroke of the piston into the cans or other containers to be filled. One fact of importance to be noted is that as long as material is in the tank 16, the passage or ports 104, 107 and 101 are always filled with material. Moreover, the passages 106 and 110 are always filled with material as above described. Although the passage 101 extends upwardly, the upper end thereof is at a lower level than the normal level of the material to be filled in the tank 16. This is an important factor in securing accurate volumetric fill of the containers. Moreover, flow downward through port 101 is blocked by the valve during the discharge of material into the containers. Accurate volumetric fill is also aided by the downward and outward slope of the reservoir base 44; by the centrifugal forces exerted on the material by the rotating reservoir 16; and by the difference in static pressure between the normal level of material in the reservoir and the level of the lower part of the cylinders.

The means provided for cooperating with the valve rollers 121 to open and close the valves 98 comprises a pair of cam assemblies 126 and 127. As shown most clearly in Fig. 3, the cam assembly 126 is a valve opening cam permitting discharge of material from the cylinders while the cam assembly 127 is a valve closing cam, cutting off discharge of material from the cylinders and establishing communication between the tank and the cylinders. This is shown by the dotted line positions of the valve ports 106 and 107.

The cam assembly 126 for opening the valve to a container filling position comprises a feed trip stop cam 128 which has a cam contour 129. As shown most clearly in Figs. 10 and 12, the feed trip stop cam is carried by a downwardly and inwardly directed arm 131 suspended from the cam support ring 58 by means of bolts 130. The depending arm 131 together with its inwardly bent portion brings the feed trip stop cam in alinement with the path of rotation of the valve trip rollers 121. The cam assembly 126 also includes a feed trip cam 132 which has a cam surface 133 normally in the path of movement of the valve trip rollers 121. Means are provided as will presently appear for shifting the feed trip cam 132 substantially radially inward and outward so as to move it out of the path of movement of the valve trip rollers 121.

When in normal position, as shown in Fig. 3, the cam surface 133 of the feed trip cam 132 engages the roller and the continued movement of the roller to the right, as viewed in Fig. 3, causes the roller to swing downward and move the valve 98 from the position shown at the second station of Fig. 3 to that shown at the third station in that view. In that latter position the through opening 106 in the valve is in alinement with the openings 99 and 102 (Fig. 6) so that downward movement of the piston forces the material within the cylinder into the container. The gradual filling of the containers is indicated by the dotted lines in the containers at the successive stations of Fig. 3. The function of the feed stop cam 128 and its cam surface 129 is to control the downward movement of the valve trip rollers 121 to prevent the feed trip cam from overthrowing the rollers. This controlled action positively positions the rollers and insures that the through opening 106 in the valve will be in positive alinement with the openings 99 and 102.

As shown in Fig. 3, during the filling operation, the feed rollers 92 lie between and are in free rolling engagement with both the upper and lower cams 63 and 68 and that the cam surfaces or tracks formed thereby are downwardly sloping. This causes gradual downward movement of the pistons so as to discharge the material to be canned into the containers. The pistons are urged toward their bottom position by the downward slope of the upper cam 68. During this operation, the lower cam 63 merely functions to prevent too rapid downward movement of the piston which might occur in the case of a free flowing liquid, such as concentrated orange juice, which would offer little resistance to downward gravity movement of the piston.

Filling of a can or other container is completed when its corresponding piston and valve trip roller reaches and is actuated by the cam assembly 127. The cam assembly 127 comprises a valve closing cam 134 having a cam surface 135 which engages the valve trip roller 121 during its continued rotation. The valve closing cam 134 is carried by an arm 136 suspended from the cam supporting ring 58 in a manner similar to the arm 131 of the feed trip stop cam. When a valve roller 121 engages the valve closing cam surface 135, the roller is lifted from its lower position just beyond the cam assembly 127. In this position the valve is closed and flow of material from the cylinders to the cans or other containers is cut off. As indicated in dotted lines (Figs. 3), during this operation the cylinder is placed in communication with the port 104 (Fig. 8) which connects with the tank by placing the port 107 in the valve in communication with the port 104. This action also places the valve port 107 in communication with the port 101 so that upon upward movement of the piston 76, the material to be canned or packed may flow into the cylinder upon upward movement of the piston.

It will be noted that at this point, the upper cam 68 terminates and the feed rollers 92 are under the control of the lower cam 63. Beyond the cam assembly 127 at the right hand portion of Fig. 3, this cam slowly rises so as to move the piston 76 in an upward direction and create a subatmospheric pressure below the face of the piston which withdraws material from the tank 16. The cam assembly 127 also may include a stop 138 which when the valve trip roller 121 is thrown upward, serves to prevent overthrow of the valve roller so that positive alinement of the ports 104, 107 and 101 is assured.

The particular cams 63 and 68, together with the adjustments which may be made are designed so that the rise thereof which controls the volumetric fill is suitable for filling a reasonable range of sizes of cans or other containers. When sizes of containers beyond that range are to be filled, the cams 63 and 68 are replaced as a unit. This is accomplished by removing the cam adjusting brackets 61 (Fig. 2) from the threaded posts 59. The cams 63 and 68 then may be replaced by other cams having a different rise resulting in a different volumetric fill. Thus the machine is adapted to fill various sizes of containers within the limits of the flow capacity of the cylinders 74. When a change is made in the diameter of the container 49 to be filled, the feed chucks 51 are also changed so as to accommodate a container of different diameter.

When the container size is varied to a volume within the range of the cams with which the machine is equipped, adjustment may be made by changing the position of the cam adjusting bracket along the post 59. Thus, for example, if a larger volume of container is to be filled the cam adjusting bracket 61 (Fig. 2) is moved upward along the post which tilts the cams to a greater extent. As previously mentioned the cams are supported at three points (Fig. 1). The upward tilting of the cams at the right of Fig. 2 causes a lowering of the cams at the left of Fig. 2. To allow for this tilting action the lowermost position of the piston, when the machine is filling containers of the size for which the cams are particularly designed, is somewhat above the position indicated in Fig. 6. This allows for some increased downward movement of the piston when the machine is to be used for filling a somewhat larger container. However, a substantial upward movement of the bracket 61 to raise the cams at the right of Fig. 2 results in only a slight downward movement of the cams at the left of Fig. 2 because of the relative position of the brackets 60 and 61 (see Fig. 1). As previously mentioned the brackets 60 are substantially rigidly connected to their posts. However, this tilting action can be accomplished due to the spring of the material of the cams and the fact that the points of attachment of the brackets 60 to their posts will yield slightly. Moreover, even if the cams should be warped slightly this is immaterial due to the fact that the cams are circular in section and the rollers make substantially line contact with them.

While one or more of the above changes may be necessary when a container of different volumetric capacity is to be filled, the position of the cams 63 and 68 may be adjusted slightly to secure the exact volumetric fill desired for the particular size of container employed. This is accomplished by changing the position of the cam adjusting bracket along the post 59. The amount of this adjustment to secure accurate fill need be small. It is only necessary to shift the cam adjusting bracket one or two threads of the nuts 62 or perhaps only as much as a quarter turn of the nuts to obtain the exact volumetric fill desired. When desired also the cylinders 74 may be changed to cylinders of greater or lesser volume than those shown.

The means for feeding the cans or other containers to the machines may be driven from the main shaft 17 (Fig. 2) by means of a bevel pinion 141 mounted on the main shaft 17 which meshes with a bevel gear 142 mounted on a shaft 143, the lower end of which projects through the cover 144 of the feed casing. Carried by the cover 144 of the feed casing is a housing 146 through a bore in which the shaft 143 projects in an upward direction. Suitable bearings for the shaft 143 may be provided in the cover part 144 and in the casing 146.

Rigidly secured to the shaft 143 is a bevel gear 147 which meshes with a bevel pinion 148 rigidly secured to a shaft 149. The shaft 149 is provided with suitable bearings, as diagrammatically illustrated at 151, and the extended end is adapted to receive a sprocket for the reception of a chain 152 (Fig. 1). The chain 152 in turn drives a sprocket mounted on a shaft 153. The shaft extends through a suitable bearing support 154 and drives a suitable helical container feed and spacing screw 156.

The mechanism for feeding the cans or other containers to the machine constitutes no part of my present invention but, in general, the containers are fed by means of a chain 157 which may be driven by a shaft 158, driven from the shaft 153 through suitable gears and chains (not shown) but diagrammatically illustrated generally by the numeral 159. The container feeding mechanism includes an idler safety star wheel 161 and a plurality of spring pressed fingers 162 which may yield should the safety star wheel fail to regulate the flow of containers so that they enter the feed and spacing screw 153 improperly. Mechanism of this general type is well known in the art and need not further be described.

The containers are fed by the mechanism briefly described above into cooperative relation with a star wheel 162 which picks up the cans or other containers and feeds them over a stationary table 163. The star wheel 162 is driven by the shaft 143 (Fig. 2) through a star wheel hub 160 fixed to the shaft in any suitable manner. A guide segment 164 which is formed substantially on the arc of a circle confines the containers and guides them so that, in cooperation with pockets formed on the star wheel and the fingers on the feed chucks, the containers are guided into the feed chuck pockets.

The machine of my invention is provided with a no-can, no-fill mechanism. This mechanism is shown in Figs. 10 to 13 inclusive and comprises a trip shoe 171 the side edge of which lies in the path of movement of the cans deposited in the feed chucks 51 by the mechanism above described. The trip shoe 171 is of such length that when a can is in each of the pockets as they pass the trip shoe, the trip shoe will always engage one of the cans, that is, its length is such that when one can passes from engagement with the trip shoe, the next succeeding can engages it so as to hold the trip shoe in the position shown in solid lines in Fig. 11. Should, however, one of the feed chucks be empty by reason of failure of the can supply or failure of the can feed mechanism to feed a can into the feed chuck, the trip shoe will not be engaged by a can and the trip shoe will move to the dotted line position shown in Fig. 11 under the influence of a spring as will presently appear.

The trip shoe 171 is fixed by suitable bolts 172 to a trip arm 173. Carried by one of the cam support ring posts 57 is a support arm 176 which is fixed with respect to the post as indicated at 174. The outer end of the support arm 176 is enlarged as shown at 177 and provided with a bore through which a pivot stud 178 extends. The trip arm 173 is enlarged at its outer end and provided with a bearing 179 which has a bore for the reception of the pivot stud 178. Suitable bearing surfaces are provided for enabling the trip arm 173 to pivot on the pivot stud 178. The trip arm 173 extends forwardly, as indicated at 181, and is provided with an aperture for the reception of a link 182 which is connected, as shown at 183, to a bell crank 184. The bell crank is pivoted at 186 and the other arm of the bell crank is adapted to receive the end of a link 188 in an aperture formed therein as shown at 187.

The link 188 is secured to a trip cam lever 189 rigidly secured to a trip cam shaft 191. A suitable bearing support 192 is attached to the under side of the cam support ring, as shown at 193, and a trip cam 194 is attached rigidly to the extended end of the trip cam shaft 191 (Fig. 10).

Referring now to Fig. 11, a bracket 196 is attached, as indicated at 197, to the cam support ring 58 and its outer end is bent downward and apertured for the reception of a spring 198 (see also Fig. 10). The other end of the spring 198 is attached to a pin 199. The pin 199 is carried by a slide element 201 (Figs. 11 and 12) which is secured by means of bolts 202 to the feed trip cam 132 (Fig. 12).

The slide 201 has a downwardly extending part 203 (Fig. 12) adapted to be engaged by the trip cam 194. The slide 201 is provided with a slot 204 through which a bolt 206 extends. The bolt extends through a support 205 carried by the cam support ring 58 in any suitable manner. The slide 201 is movable from the position shown in Fig. 11 in solid lines to that shown in the same figure in dotted lines and is integral with an arm 207 pivoted at 208 on a pivot pin which extends through a boss 209 formed on the cam support ring 58. A stud and nut assembly 211 forms the pivot about which the arm 207 may swing together with the slide 201.

It will now be appreciated that when cans are normally fed into the feed chuck 53 and each feed chuck is occupied by a container, the parts are in the position shown in Fig. 11 in solid lines with the trip shoe 171 in continuous engagement with at least one container. When, however, a container is not delivered to a feed chuck by the container feeding mechanism, the spring 198 pulls the slide element 201 outward, as indicated in dotted lines, thereby moving the trip cam 194 upward and rotating the trip cam shaft 191. This action rotates the bell crank 184 in a clockwise direction, as viewed in Fig. 10, to move the trip shoe 171 to the dotted line position shown in Fig. 11.

During and allowed by the above action of the trip shoe 171 the slide 201 is shifted to the dotted line position shown in Fig. 12 and the feed trip cam 132 is moved out of the path of movement of the feed trip rollers (see Fig. 3). Thus, the feed trip roller is retained in its upper position as shown at the first two stations at the left in Fig. 3 and the through opening or port 106 in the valve (Fig. 4) is not brought into registry with the ports 99 and 103 (Fig. 8). Thus the valve ports are retained in the position shown in Fig. 8 with the valve port 107 in communication with the ports 101 and 104. Downward movement of the piston then merely returns the material in the cylinder back to the tank 16. It will be particularly noted that the operation is such that should a feed chuck not be filled, the valve is not rotated to its discharge position but if succeeding feed chucks are filled with containers, normal filling of the containers is again initiated without any interruption of the machine or any attention on the part of the operator.

The filled containers, as shown in Fig. 1, are guided from the feed chucks by a discharge rail 212 by which they may be deposited upon continued rotation of the feed chucks on a suitable conveyor diagrammatically illustrated by the numeral 213.

One fact of importance should be noted. The major parts are easily removable for replacement repair, adjustment or cleaning. The valves may be quickly removed as described above; the cams 63 may be easily adjusted or removed if necessary; the cylinders may be removed from their platform 72 as individual units; and each of the pistons may be removed when the rollers 92 are not beneath the cam 63 by merely lifting them out, the slots 81 being open at their upper ends for this purpose.

It will be appreciated that I have provided a novel no-can, no-fill mechanism which is simple and positive in its operation and requires no attention on the part of the operator; have provided a simplified assembly of cams for controlling the amount of fill which is adjustable and replaceable to enable the filling of containers of other sizes; have provided an accurate means of volumetrically filling the containers together with a valve, the passages of which are always maintained filled and the position of which is accurately controlled so as to insure positive delivery of the material into the containers and positive non-drip cut-off when the containers are filled; and have provided a machine which is adapted not only for the filling of various sizes and diameters of containers but also for filling containers with both freely flowable and sluggishly flowable materials.

While I have shown and described the preferred form of my invention, it will be apparent that various changes and modifications may be made therein, particularly in the form and relation of parts without departing from the spirit of my invention as set forth in the appended claims.

I claim:

1. In a filling machine the combination of a reservoir, a cylinder having a piston operable therein and a rotatable valve, said valve having an intake port and a discharge port which extends completely through the valve, means for rotating said valve to either of two possible positions, said valve in one of said positions establishing communication between the reservoir and the cylinder through the intake port and cutting off communication between the discharge port and the container to be filled and said valve in the other of its positions establishing communication between the cylinder and the container to be filled through the discharge port and cutting off communication between the reservoir and the cylinder, and means for maintaining communication between said cylinder and said discharge port when the valve is in the first of its communicating positions whereby the entire discharge port of the valve is maintained full of the material being filled.

2. In a filling machine the combination of a cylinder having a piston operable therein, a reservoir for the material and a valve located below the cylinder and below the lower level of the material in the reservoir, said valve having a seat and the valve and its seat being frusto-conical in shape, means including a spring pressing end-wise on the large end of the valve to retain the valve firmly on its seat, an outlet port in the seat, an outlet port in the valve for connecting the cylinder with the outlet port in the seat when the valve is rotated to bring said outlet ports in alignment, said ports providing a through vertically extending opening when brought into alignment, and a passage extending circumferentially of said valve for maintaining the valve outlet port full of material when the valve is closed.

3. In a filling machine, the combination of a cylinder and a piston operable therein, said cylinder having intake and discharge ports adjacent its lower end, a valve having two possible positions and having intake and discharge ports located below said cylinder, a reservoir having a port adjacent its lower periphery, a container feed chuck located below the valve, means including a single roller for rotating the valve to either of said possible positions comprising a stationary valve opening cam engaged by said roller and a stationary valve closing cam engaged by said roller, means for rotating said feed chuck, cylinder, valve, roller and reservoir together as a unit, means for reciprocating said piston in timed relation to the position of said cams in the path of rotation of said valve roller whereby the valve closing cam actuates the valve to place the reservoir port and said intake ports in communication with the cylinder when the piston starts on its intake stroke and the valve opening cam actuates the valve to place the discharge ports in communication with each other to discharge material into a container, and means for preventing overtravel of the valve when the piston starts on its intake and discharge strokes.

4. In a filling machine the combination of a reservoir, means for discharging material from the reservoir into the containers to be filled, said means including a pair of cams at least one of which extends in complete surrounding relation to the reservoir, means for supporting at least one of the cams from a stationary part of the machine, means for supporting the other of said cams from the first cam, said last mentioned means including an adjustment for varying the spacing between the cams, and means for tilting both cams simultaneously to a greater or lesser extent to increase or decrease the volume of fill.

5. A machine in accordance with claim 4 in which the means for discharging material from the reservoir into the containers includes a plurality of vertically reciprocating pistons, each having an actuating roller which rides between said cams, said cams being circular in cross-section and said rollers being always rotatable on an horizontal axis whereby regardless of the angular position of the cams the rollers make line contact therewith.

6. A filling machine comprising, in combination, a plurality of cylinders each having a piston operable therein, rollers each having a connection to one of said pistons, said cylinders each being open at the top and having a slot extending downwardly from the top with the roller connections extending through said slot, means for rotating said cylinders, a pair of cams encircling said cylinders between which said rollers ride to reciprocate said pistons, the lower of said cams being continuous and the upper cam being non-continuous to provide at least one space between cam ends constituting a cleaning station, a removable rotary valve associated with each of said cylinders, means for rotating said valves in timed relation with the reciprocations of said pistons comprising a valve opening cam and a valve closing cam which are separated from each other at least at the cleaning station whereby the pistons and valves are readily removable at the cleaning station to facilitate cleaning of the machine.

7. A filling machine comprising, in combination, a reservoir for the material, a plurality of cylinders mounted vertically externally of and around the reservoir, means for rotating said reservoir and the whole of each of said cylinders as a unit about an axis of rotation with the axes of the cylinders parallel thereto, each of said cylinders having a piston operable therein, a rotatable conical valve for each of said cylinders located at the bottom thereof and having an inlet port and an outlet port, means for rotating said valve to provide communication through said inlet port between the tank and the cylinder, means for rotating said valve to cut off said inlet port and establish communication between said cylinder through said outlet port to the container to be filled, mechanical means for operating each of said pistons to draw material from said reservoir through said valve on the upstroke of the piston and discharge it through said valve on the downstroke of the piston into the container to be filled, means for adjusting said mechanical means to vary the throw of said pistons and hence the volumetric fill of the containers, said mechanical means including a pair of stationary annular cams at least one of which substantially encircles the reservoir, supports at least one of which is adjustable for supporting the encircling cam, said other cam being supported from the encircling cam so that both cams may be adjusted simultaneously and means for varying the spacing between said cams.

8. A machine in accordance with claim 7 in which the supports for the cams are located at only three spaced points so that the cams may be tilted as a whole and the cams being circular in cross section and devoid of abrupt changes in contour.

9. A filling machine comprising, in combination, a reservoir for the material, a plurality of cylinders mounted vertically externally of and around the reservoir, means for rotating said reservoir and the whole of each of said cylinders as a unit about an axis of rotation, each of said cylinders having a piston vertically operable therein, a frusto-conical rotatable valve for each of said cylinders located at the bottom thereof and having an inlet port and an outlet port, each of said valves extending radially of the axis of rotation of the reservoir, means for rotating said valve to provide communication through said inlet port between the tank and the cylinder, means for rotating said valve to cut off said inlet port and establish communication between said cylinder through said outlet port to the container to be filled, each of said valves having a seat and means including a spring for urging said valve into engagement with its seat, mechanical means for operating each of said pistons to draw material from said reservoir through the inlet port of said valve on the upstroke of the piston and discharge it through the outlet port of said valve on the downstroke of the piston into the container to be filled, said outlet port of the valve extending completely through the valve and the valve having an additional passage connecting the reservoir with the discharge outlet so that the discharge outlet is connected to the reservoir and is maintained full of material when the valve is closed.

10. A filling machine comprising, in combination, a reservoir for the material, a plurality of cylinders mounted vertically externally of and around the reservoir, means for rotating said reservoir and the whole of each of said cylinders as a unit about an axis of rotation, each of said cylinders having a piston vertically operable therein, a frusto-conical rotatable valve for each of said cylinders located at the bottom thereof and having an inlet port and an outlet port, each of said valves extending radially of the axis of rotation of the reservoir, means for rotating said valve to provide communication through said inlet port between the tank and the cylinder, means for rotating said valve to cut off said inlet port and establish communication between said cylinder through said outlet port to the container to be filled, each of said valves having a seat and means including a spring for urging said valve into engagement with its seat, mechanical means for operating each of said pistons to draw material from said reservoir through the inlet port of said valve on the upstroke of the piston and discharge it through the outlet port of said valve on the downstroke of the piston into the container to be filled, a roller operably connected to each of said valves and a pair of cams normally in the path of movement of said rollers between which the rollers pass, one of said cams being a valve opening cam and the other of said cams being a controlling cam which acts to guide the roller opening movement and as a stop to prevent over travel of the valve, and means including a no can no fill mechanism for moving said valve opening cam out of the path of movement of said rollers.

11. A filling machine in accordance with claim 10 in which means including a cam and a stop are provided between which the rollers pass to move said valve to a closed position, said last mentioned cam and stop being spaced around the path of rotation of the rollers from the valve opening cam.

EVERETT S. MINARD.

References Cited in the file of this patent

UNITED STATES PATENTS

| Number | Name | Date |
|---|---|---|
| 660,101 | Goodlett | Oct. 23, 1900 |
| 961,408 | Hebrank | June 14, 1910 |
| 989,546 | Jensen | Apr. 11, 1911 |
| 1,365,773 | Dickerson | Jan. 18, 1921 |
| 1,726,297 | Hansen | Aug. 27, 1929 |
| 1,756,548 | Hansen | Apr. 29, 1930 |
| 2,156,951 | Mondloch | May 2, 1939 |
| 2,220,707 | Chapman | Nov. 5, 1940 |
| 2,321,994 | Chapman | June 15, 1943 |
| 2,374,268 | Bingham | Apr. 24, 1945 |
| 2,590,556 | Marchadour | Mar. 25, 1952 |